United States Patent Office 3,840,547
Patented Oct. 8, 1974

3,840,547
PROCESS OF PREPARING PYRIDYL KETONES
Wilford L. Mendelson, Philadelphia, Pa., assignor to Smithkline Corporation
No Drawing. Original application July 8, 1971, Ser. No. 160,934, now Patent No. 3,755,341, dated Aug. 28, 1973. Divided and this application Apr. 30, 1973, Ser. No. 356,033
Int. Cl. C07d 31/32
U.S. Cl. 260—297 R       4 Claims

ABSTRACT OF THE DISCLOSURE

Process of preparing pyridyl carbinols and ketones by the reaction of a halopyridine, lithium and a carbonyl or nitrile compound in a one step procedure. The pyridyl carbinols and ketones are useful as intermediates for compounds having pharmacological activity, for example antihistamine or bronchodilator compounds.

---

This is a division of application Ser. No. 160,934 filed July 8, 1971, now U.S. Pat. No. 3,755,341.

This invention relates to a process of preparing pyridyl carbinols and ketones. The pyridyl carbinols and ketones prepared by the process of this invention are useful as intermediates for compounds having pharmacological activity, for example antihistamine compounds such as phenyl-pyridyldialkylaminoalkanes and dialkylaminoalkyl α-phenylpyridylmethyl ethers and bronchodilator compounds such as hydroxyphenyl-2-piperidinyl carbinols.

According to the process of this invention, pyridyl carbinols and ketones are prepared by the reaction of a halopyridine, lithium and a carbonyl or nitrile compound in a one step procedure.

The process of this invention provides a good yield of product by a procedure which is carried out in one step and is advantageous over prior art methods using pyridyl lithium or Grignard compounds.

By the prior art method of preparing pyridyl carbinols and ketones using pyridyl lithium, two steps are required, the pyridyl lithium is first prepared and then reacted with a carbonyl or nitrile compound. According to the prior art, halopyridines do not react satisfactorily with metallic lithium to form pyridyl lithium compounds. "The Chemistry of Heterocyclic Compounds, Pyridine and Its Derivatives," Part Two, Klingsberg, Ed., Interscience Publishers, Inc., 1961, pages 422–428. By the prior art method, pyridyl lithium compounds are prepared by the reaction of a halopyridine with an alkyl lithium compound, such as n-butyl lithium, at low temperature, i.e. at −45° C. to −35° C., and pyridyl carbinols and ketones are then prepared by reacting pyridyl lithium with a carbonyl or nitrile compound in a second step at about −40° C. Wibaut et al., Recueil 70:1054 (1951). The process of this invention is an improvement in that it is carried out in one step and does not require the very low temperature of the prior art method.

Also, the process of this invention is advantageous over the prior art Grignard method of preparing pyridyl carbinols and ketones. Halopyridines do not readily form Grignard compounds and when formed, the reaction of the pyridyl magnesium halides to give carbinols and ketones gives poor yields of the products. "The Chemistry of Heterocyclic Compounds, Pyridine and Its Derivatives," Part Two, Klingsberg, Ed., Interscience Publishers, Inc., 1961, pages 437–439.

Pearce et al., "A One-step Alternative to the Grignard Reaction," Chem. Comm., page 1160 (1970), have reported the reaction between organic halides, lithium and carbonyl compounds. Pearce et al. illustrate this reaction with alkyl halides, bromobenzene and allyl bromide. All of these would react with magnesium to form stable Grignard compounds. Pearce et al. describe their process as a Grignard-type reaction.

Unexpectedly, it has now been found that halopyridines, which do not readily form Grignard compounds, react with lithium and a carbonyl or nitrile compound to form pyridyl carbinols and ketones.

Preferably, the carbonyl or nitrile compound used in the process of this invention is a benzaldehyde, phenyl ketone, benzoic acid ester, benzoic acid anhydride or benzonitrile, of which the phenyl groups are optionally substituted. Preferably, the halopyridine used in the process of this invention is optionally substituted by a lower alkyl group.

The process of this invention is illustrated by the following reaction sequence:

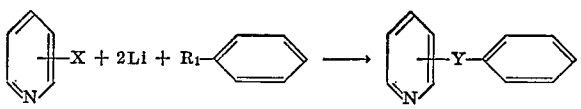

in which:

X is chloro, bromo or iodo, preferably chloro or bromo;
$R_1$ is

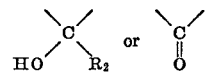  or  $-C\equiv N$;

$R_2$ is hydrogen, lower alkyl or phenyl;
$R_3$ is lower alkyl; and
Y is $$\diagdown \!\! \underset{\underset{R_2}{HO}}{C} \!\! \diagup \quad \text{or} \quad \diagdown \!\! \underset{\underset{O}{\parallel}}{C} \!\! \diagup$$

In the above compounds, the pyridyl ring is optionally substituted, for example by lower alkyl, and the phenyl ring is optionally substituted by chloro, lower alkyl or lower alkoxy.

The process according to this invention is carried out by adding the halopyridine and the carbonyl or nitrile compound to two equivalents of lithium in a dry inert solvent such as an ether, for example tetrahydrofuran or dimethoxyethane, preferably tetrahydrofuran. The reaction is carried out at reduced temperature, for example at about −10° C. to +5° C., preferably at about −5° C. to 0° C., under an inert atmosphere, for example helium or, preferably, argon.

Hydroxyphenyl-2-piperidinylcarbinols having bronchodilator activity are prepared by reacting a halopyridine, lithium and a lower alkoxy-benzaldehyde, oxidizing the resulting lower alkoxyphenyl-2-pyridyl carbinol to the corresponding ketone, dealkylating the lower alkoxy group or groups and reducing the ketone to a carbinol and the pyridyl to a piperidyl ring.

Alternatively, reacting a halopyridine, lithium and a lower alkoxy substituted benzoic acid ester or anhydride or benzonitrile, then dealkylating the lower alkoxy group of the resulting lower alkoxyphenyl 2-pyridyl ketone and reducing the ketone to a carbinol and the pyridyl to a piperidyl ring gives hydroxyphenyl-2-piperidinylcarbinols.

Antihistamine compounds are prepared from phenylpyridyl carbinols and ketones by known procedures. For example, dialkylaminoalkyl α-phenylpyridylmethyl ethers are prepared by condensing a phenyl-pyridyl carbinol, preferably as the sodio derivative, with a dialkylaminoalkyl halide.

Phenyl-pyridyl-dialkylaminoalkanes, such as pheniramine or chlorpheniramine, are prepared by reducing a phenyl-pyridyl carbinol or ketone, for example using boron hydride/boron trifluoride, and alkylating the resulting benzylpyridine by treating with sodium amide and N,N-dimethyl-2-chloroethylamine.

The following examples are not limiting but illustrate the process of this invention.

EXAMPLE 1

To 0.28 g. (0.04 m.) of lithium in 20 ml. of dry tetrahydrofuran, stirred at —5° C. under helium, is added 2.5 g. (0.022 m.) of 2-chloropyridine and 2.7 g. (0.02 m.) of p-anisaldehyde. The resulting mixture is stirred at —5° C. for three hours, then is stirred at room temperature for 1.5 hours.

The tetrahydrofuran is evaporated off, *in vacuo,* and ice water is added to the residue. The mixture is extracted with ethyl acetate, the solvent is removed from the extract *in vacuo* and the residue is slurried with ether and filtered. The solid material is recrystallized from ethyl acetate-cyclohexane to give p-anisyl-2-pyridylcarbinol, m.p. 123–126° C.

EXAMPLE 2

To 0.118 g. of lithium in 10 ml. of dry tetrahydrofuran, stirred at 0° C. under helium, is added 1.78 g. of 2-bromopyridine and 1.36 g. of p-anisaldehyde. The resulting mixture is kept cold for one hour, then stirred at room temperature for three hours.

The mixture is poured over ice and extracted with ethyl acetate, ether and a mixture of these solvents. The extracts are combined, dried over magnesium sulfate and the solvents are removed *in vacuo.*

The residue is triturated with ether and filtered to give p-anisyl-2-pyridylcarbinol.

EXAMPLE 3

To 0.138 g. of lithium in 10 ml. of dry tetrahydrofuran, stirred at —5° C. to 0° C. under helium, is added 1.78 g. of 2-bromopyridine and 1.33 g. of p-anisonitrile in tetrahydrofuran. The resulting mixture is stirred at 0° C. for two hours and then allowed to warm to room temperature over two hours with stirring. The mixture is then filtered and concentrated *in vacuo.* The residue is slurried with ether. The ether is decanted from the resulting oily material. The oily material is dissolved in 3N sulfuric acid. The mixture is stirred for 30 minutes at room temperature, then cooled to 0° C. Ammonium hydroxide is added and the precipitate is filtered off to give p-anisyl-2-pyridyl ketone.

EXAMPLE 4

By the procedure of Example 1 using, in place of p-anisaldehyde, the following:

benzaldehyde
o-chlorobenzaldehyde
p-chlorobenzaldehyde
o-tolualdehyde
3,4-methylenedioxybenzaldehyde the products are, respectively:

phenyl-2-pyridylcarbinol
o-chlorophenyl-2-pyridylcarbinol
p-chlorophenyl-2-pyridylcarbinol
o-tolyl-2-pyridylcarbinol
3,4-methylenedioxyphenyl-2-pyridylcarbinol.

EXAMPLE 5

To 0.02 m. of lithium in dry ether, stirred at 0° C. under argon, is added 0.011 m. of 4-chloropyridine and 0.01 m. of benzaldehyde. The mixture is stirred at 0° C. for three hours, then at room temperature for two hours.

The ether is evaporated off, *in vacuo.* Ice water is added and the mixture is extracted with ethyl acetate. The extract is concentrated and the residue is triturated with ether and filtered to give phenyl-4-pyridylcarbinol.

EXAMPLE 6

By the procedure of Example 3, using 2.86 g. of p-anisic acid anhydride in place of p-anisonitrile, p-anisyl-2-pyridyl ketone is obtained.

EXAMPLE 7

By the procedure of Example 3, using 1.50 g. of ethyl benzoate in place of p-anisonitrile, the products are phenyl-2-pyridyl ketone and phenyl-bis-(2-pyridyl)carbinol. The products are separated by standard procedures such as fractional recrystallization or fractional distillation.

What is claimed is:

1. An improved process of preparing pyridyl ketones the improvement which consists essentially of reacting in one step a halopyridine, lithium and a benzonitrile compound selected from the group consisting of unsubstituted benzonitrile, halobenzonitrile, lower alkyl benzonitrile or lower alkoxy benzonitrile in an ether solvent at about —10° to +5° C.

2. The process of claim 1 in which two equivalents of lithium are used.

3. The process of claim 1 in which the reaction is carried out in tetrahydrofuran.

4. The process of claim 1 which comprises reacting in one step 2-bromopyridine, lithium and p-anisonitrile to give p-anisyl-2-pyridyl ketone.

References Cited
UNITED STATES PATENTS 3,338,909   8/1967   Barringer et al. ____ 260—297 R
3,702,361  11/1972  Phillips _____ 260—297 R ALAN L. ROTMAN, Primary Examiner U.S. Cl. X.R.

260—293.84